(12) United States Patent
Andronaco et al.

(10) Patent No.: US 6,458,446 B1
(45) Date of Patent: Oct. 1, 2002

(54) THERMOPLASTIC SHEET WITH TEXTURED SURFACE FOR USE IN COMPOSITE LAYERED PRODUCT WITH INTERLOCKING INTERFACE AND METHOD THEREOF

(75) Inventors: Ronald V. Andronaco; Joseph H. Beaumont, both of Alto, MI (US)

(73) Assignee: Pureflex, Inc., Kentwood, MI (US)

( * ) Notice: Subject to any disclaimer, the term of this patent is extended or adjusted under 35 U.S.C. 154(b) by 0 days.

(21) Appl. No.: 09/396,818

(22) Filed: Sep. 14, 1999

(51) Int. Cl.$^7$ ................................................ B32B 3/00
(52) U.S. Cl. ........................ 428/161; 428/33; 428/53; 428/120; 428/156; 428/171; 428/180
(58) Field of Search .......................... 428/33, 161, 171, 428/120, 156, 180, 53, 54

(56) References Cited

U.S. PATENT DOCUMENTS

| | | | |
|---|---|---|---|
| 2,976,093 A | | 3/1961 | Reiling |
| 4,310,370 A | * | 1/1982 | Arai et al. .................. 156/220 |
| 5,502,940 A | * | 4/1996 | Fifield ..................... 52/309.12 |

OTHER PUBLICATIONS

Modern Plastics Mid–October Encyclopedia Issue; Resins and Compounds, pp. 26 and 27; pp. 66 and 67; Fabricating and Finishing; pp. 389–391; Chemicals and Additives; pp. 192–196. (no date).

* cited by examiner

Primary Examiner—Paul Thibodeau
Assistant Examiner—Christopher Paulraj
(74) Attorney, Agent, or Firm—Young & Basile, P.C.

(57) ABSTRACT

A process for manufacturing a part includes the steps of molding a thermoplastic material into a generally planar sheet form having a textured surface on at least one side. The textured surface is defined by a plurality of protuberances with at least one side wall extending outwardly from the sheet. The thermoplastic material is molded with a predetermined pressure between a die and within a perforated insert. The molded thermoplastic material sheet and perforated insert are removed from the die after molding. The molded thermoplastic material sheet is sintered at a predetermined temperature for a predetermined period of time. The molded, sintered, thermoplastic material sheet is stripped from the perforated insert. The sheet can be masked for etching if desired. The sheet can be inserted into a molding die, where a dissimilar material is introduced into the die under pressure. The plurality of protuberances on the sheet are deformed during the molding of the dissimilar material, so that at least one side wall of the protuberance is deformed to trap a portion of the molded dissimilar material between the side wall of each protuberance and the thermoplastic sheet material to mechanically interlock the two materials along an interface disposed therebetween.

32 Claims, 2 Drawing Sheets

THERMOPLASTIC SHEET WITH TEXTURED SURFACE FOR USE IN COMPOSITE LAYERED PRODUCT WITH INTERLOCKING INTERFACE AND METHOD THEREOF

FIELD OF THE INVENTION

The present invention relates to a method of producing a thermoplastic sheet having a textured surface, the product produced by the method, and the method of using the thermoplastic sheet with textured surface to produce a composite layered product of dissimilar materials with interlocking interface between the layers, and the product produced thereby.

BACKGROUND OF THE INVENTION

It has been known to create composite layered materials or products with dissimilar materials by using adhesive or chemical bonding between the dissimilar layers. The plastic materials have been notoriously difficult to successfully adhesively or chemically bond to one another. Many plastic materials after being adhesively or chemically bonded together are subject to difficulties associated with delamination, tensile-sheer, tensile-peel, impact resistance, wedge cleavage, and dynamic fatigue. In dynamic fatigue testing of adhesively bonded parts, the joint is loaded to a percentage of its typical breaking load and the cycles to failure are recorded. In addition to carrying out simulated load testing, evaluations are made in aggressive environments to estimate the service life of a part bonded with a particular adhesive. These tests can be carried out after conditioning the specimens at elevated temperatures, in humid aging, and after thermal cycling (thermal shock exposures). A mismatch in thermal coefficient of expansion of adhesive and substrates can lead to delamination or cracking in the adhesive layer. Even though many advances have been made in adhesive and chemical bonding techniques, the estimated service life of adhesively bond or chemically bonded plastic parts in particularly aggressive environments have been less than satisfactory.

SUMMARY OF THE INVENTION

It would be desirable to increase the service life of composite layered parts of dissimilar materials. Accordingly, a process is provided for manufacturing a part including the steps of molding a thermoplastic material into a generally planar sheet form having a textured surface on at least one side with a predetermined pressure between a die and a perforated insert, removing the molded thermoplastic material sheet and perforated insert from the die, and sintering the molded thermoplastic material sheet at a predetermined temperature for a predetermined period of time. The textured surface is defined by a plurality of projections or protuberances with at least one side wall extending outwardly from the sheet. The process can also include the step of stripping the sintered, molded, thermoplastic material sheet from the perforated insert, masking at least one side of the sintered, molded, thermoplastic material sheet for etching, and/or etching the textured surface of the sintered, molded, thermoplastic material sheet with a sodium-based etchant. The process according to the present invention can also include the steps of inserting the sintered, molded, thermoplastic material sheet into a molding die, introducing a dissimilar material into the molding die under pressure, and mechanically interlocking the thermoplastic material sheet to the dissimilar molded material with the plurality of protuberances. The mechanical interlocking of the thermoplastic sheet material to the dissimilar molded material is accomplished by deforming the plurality of protuberances during the molding step so that the at least one side wall of the protuberance moves into an angled orientation with respect to the thermoplastic material sheet to define a plurality of individual mechanical locking members along an interface between the thermoplastic material sheet and the dissimilar molded material. A portion of the molded dissimilar material is trapped between the angled side wall of each protuberance and the thermoplastic material sheet is mechanically interlocked along the interface with the dissimilar molded material.

A part manufactured according to the process of the present invention includes a thermoplastic material molded and sintered into a generally planar sheet form having a textured surface on at least one side. The textured surface is defined by a plurality of protuberances with at least one side wall extending outwardly from the sheet. The plurality of protuberances increases an effective surface area of the thermoplastic material sheet by at least 35%, or preferably by between 35% and 40%, inclusive. The protuberances can take any desired form, such as projections having cross sections that are circular, oval, triangular, rectangular, or other multi-sided configurations. Preferably, a circular cross section is provided. The part manufactured according to the process of the present invention can also include a dissimilar material layer molded to the textured surface of the sheet with a mechanically locked interface between the dissimilar material layer and the sheet as a result of deformation of the protuberances during the molding process to produce a composite layered product. The composite layered product can be used in a wide variety of applications, such as for valve diaphragms, pump diaphragms, bearing pads, or any application where delamination of dissimilar composite layered materials is a problem.

The thermoplastic material used in the process, or in the part, can be selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultrahigh-molecular-weight polyethylene (UHMWPE), and mixtures thereof. Alternatively, the thermoplastic material used in the process according to the present invention, or in the part, can contain as a major constituent material selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultra-high-molecular-weight polyethylene (UHMWPE), and mixtures thereof.

The dissimilar material used in the process according to the present invention, or in the part, can be selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof. Alternatively, the dissimilar material used in the process according to the present invention, or in the part, can contain as a major constituent an elastomer material selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
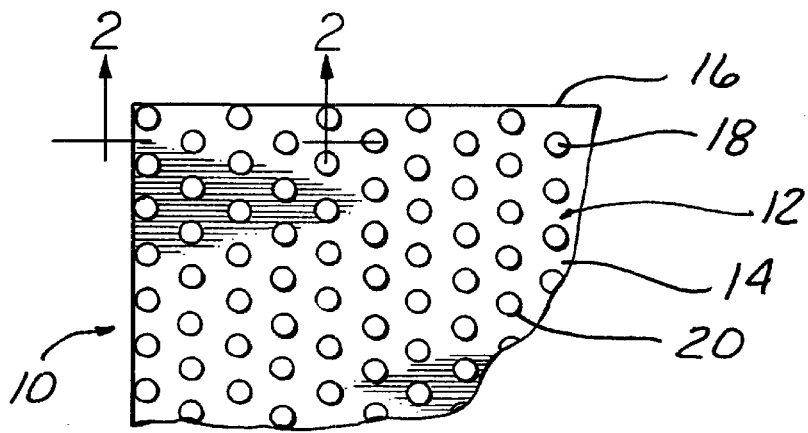
FIG. 1 is a plan view of a thermoplastic material molded and sintered into a generally planar sheet form having a textured surface an at least one side according to the present invention.

A part 10 according to the present invention is manufactured by a process including the steps of molding a thermoplastic material into a generally planar sheet form having a textured surface 12 on at least one side 14 with a predetermined pressure between a die and a perforated insert, removing the molded thermoplastic material sheet 16 and perforated insert from the die, and sintering the molded thermoplastic material sheet 16 at a predetermined temperature for a predetermined period of time. The textured surface 12 is defined by a plurality of projections or protuberances 18 with at least one side wall 20 extending outwardly from the sheet 16. The molding process can also include the steps of gradually increasing pressure on the thermoplastic material sheet 16 between the die and the perforated insert with a first predetermined force, dwelling at the first predetermined force for a first predetermined period of time, and releasing the first predetermined force on the thermoplastic material 16. The process can also include the steps of gradually reapplying increasing pressure on the thermoplastic material sheet 16 between the die and the perforated insert with a second predetermined force, dwelling at the second predetermined force for a second predetermined period of time, and releasing the second predetermined force on the thermoplastic material sheet 16.

The sintered, molded, thermoplastic material sheet 16 is stripped from the perforated insert after the sintering step. The thermoplastic material sheet 16 can be masked for etching. The masked sheet can be etched with any suitable wash, such as a sodium-based etchant for a thermoplastic material sheet composed of polytetrafluoroethylene (PTFE).

By way of example and not limitation, the process according to the present invention can be performed in a mold press using virgin PTFE. The press can subject the thermoplastic material to a molding pressure of approximately 450 tons (1,750 psi hydraulic pressure). The perforated metal insert is cleaned in advance of the molding operation. The die is also thoroughly cleaned at the beginning of the setup. The thermoplastic material fill depth in the die is set to 0.225 inches. The die is filled with a powder form of virgin PTFE and the powder is leveled off at the top of the die with a straight edged tool. The perforated metal insert is positioned on top of the powder in a center location with respect to the die. The die is moved into the press position. Blotter paper is positioned on top of the perforated metal insert, and a solid rubber matting is placed on top of the blotter paper. The upper ram is lowered into the press position, and pressure is slowly increased up to approximately 450 tons. After reaching the 450 ton pressure, the pressure is applied for approximately 60 seconds, defining a dwell cycle prior to releasing the pressure. After release of the pressure, the ram is raised away from the solid rubber matting. An additional rubber mat is positioned on top of the solid rubber matting previously positioned on top of the blotter paper. The ram is slowly lowered onto the part and pressure is raised back up to approximately 450 tons. After reaching the 450 ton pressure, the pressure is applied for approximately 60 seconds defining a second dwell cycle prior to release of the pressure. After releasing the pressure for the second time, the ram is raised to the upper position. The lower die is moved into an eject position. The molded part is removed from the die. Any excess flash is removed from the part with a razor knife. The part is placed in a vertical position in a tray for sintering. The parts are placed into an oven at approximately 700° F. and are sintered for approximately 1 hour. The parts are removed from the oven. After cooling for a predetermined period of time, the thermoplastic material sheet is stripped off from the perforated metal insert. The smooth side of the textured sheet can be masked for subsequent etching with a suitable wash. The textured surface of the virgin PTFE thermoplastic material sheet can be etched with a sodium-based etchant.

It is contemplated to be within the purview of the present invention that in addition to PTFE materials, the following materials can also be used for the thermoplastic sheet, where the thermoplastic material is selected from the group consisting of: fluoroplastic polymers; polytetrafluoroethylene (PTFE); fluorinated ethylene propylene (FEP) copolymers; perfluoroalkoxy (PFA) resins; polychlorotrifluoroethylene (PCTFE); ethylene-chlorotrifluoroethylene (ECTFE) copolymers; ethylene-tetrafluoroethylene (ETFE) copolymers; polyvinylidene fluoride (PVDF); polyvinyl fluoride (PVF); ultrahigh-molecular-weight polyethylene (UHMWPE); and mixtures thereof. Alternatively, it is contemplated to be within the purview of the present invention that in addition to PTFE materials, the following materials can also be used for the thermoplastic sheet, where the thermoplastic material contains as a major constituent a material selected from the group consisting of: fluoroplastic polymers; polytetrafluoroethylene (PTFE); fluorinated ethylene propylene (FEP) copolymers; perfluoroalkoxy (PFA) resins; polychlorotrifluoroethylene (PCTFE); ethylene-chlorotrifluoroethylene (ECTFE) copolymers; ethylene-tetrafluoroethylene (ETFE) copolymers; polyvinylidene fluoride (PVDF); polyvinyl fluoride (PVF); ultrahigh-molecular-weight polyethylene (UHMWPE); and mixtures thereof.

Figure 2:
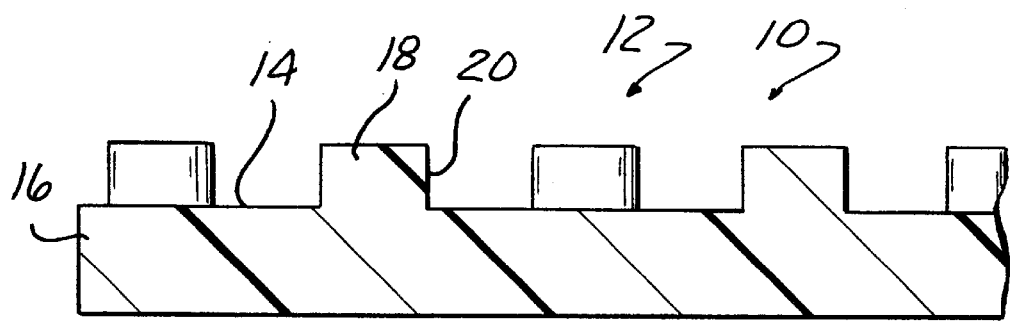
FIG. 2 is a cross sectional detail of the sheet taken as shown in FIG. 1.

While the protuberances are illustrated as having a cylindrical shape in FIGS. 1 and 2, it is contemplated to be within the purview of the present invention that in addition to cylindrical shapes, the following cross sections for protuberances can also be used: oval; triangular; rectangular; square; polygonal; or any other multi-sided cross section. Preferably, each protuberance has at least one side wall 20 extending outwardly in a direction generally perpendicular to the planar sheet 16. The protuberances 18 can be disposed in a predetermined geometric pattern, or can be randomly placed on the surface of the planar sheet 16. Preferably, the protuberances 18 are disposed in a predetermined geometric pattern. The cross section configuration of the protuberances 18 can be consistent throughout the textured surface 12 of the sheet 16, or can be varied across the textured surface 12 of the planar sheet 16 as desired for any particular application. Preferably, the protuberances 18 increase an effective surface area of the thermoplastic material sheet 16 by at least 35%, and most preferably increases an effective surface area by between 35% and 40%, inclusive. The cross sectional area of the protuberances can be the same throughout the textured surface 12 of the sheet 16, or can be varied across the textured surface 12 of the planar sheet 16 as desired for any particular application.

Figure 3:
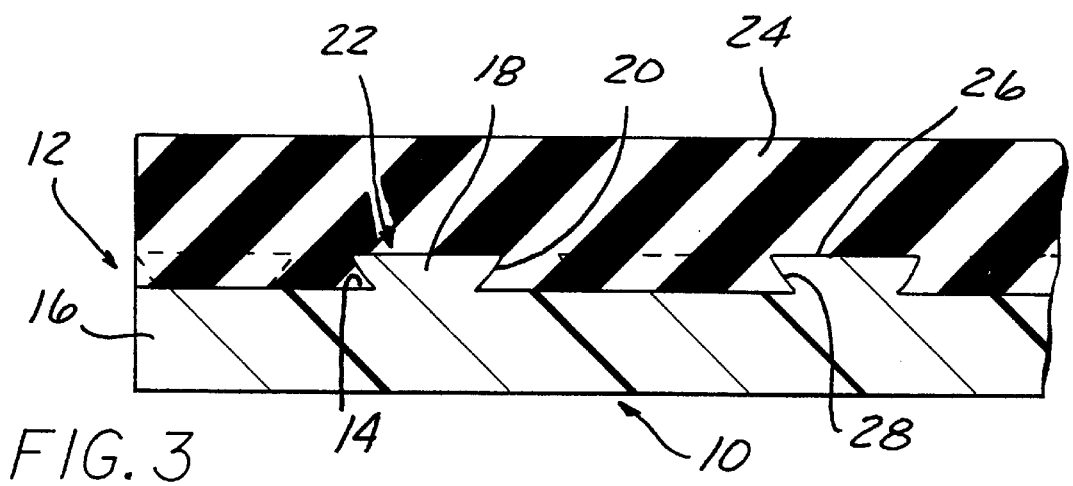
FIG. 3 is a cross sectional detail of the part according to the present invention after molding a dissimilar material layer to the textured surface of the sheet and illustrating a mechanically locked interface between the dissimilar material layer and the thermoplastic material sheet as a result of deformation of the protuberances during the molding process.

The process can also include the use of the planar sheet 16 in a composite layered product formed by including the steps of inserting the sintered, molded, thermoplastic material sheet 16 into a molding die, introducing a dissimilar material into the molding die under pressure, and mechanically interlocking the thermoplastic material sheet 16 to the dissimilar molded material with the plurality of protuberances 18. The process according to the present invention can also include the step of deforming the plurality of protuberances 18 on the thermoplastic material sheet 16 during molding of the dissimilar material, such that at least one side wall 20 of the protuberances 18 moves into an angled orientation with respect to the thermoplastic material sheet 16 to provide a plurality of individual mechanical locking members 22 along an interface between the thermoplastic material sheet 16 and the dissimilar molded material 24 as best seen in FIG. 3. The deformation of the protuberances 18 traps a portion of the molded dissimilar material 24 between the at least one side wall 20 of each protuberance 18 and the thermoplastic material sheet 16 to mechanically interlock the two materials along an interface disposed therebetween. The deformation of the protuberances 18 can define an enlarged outer portion 26 connected to the thermoplastic material sheet 16 with a smaller cross sectional area portion 28 of the protuberance 18.

Figure 4:
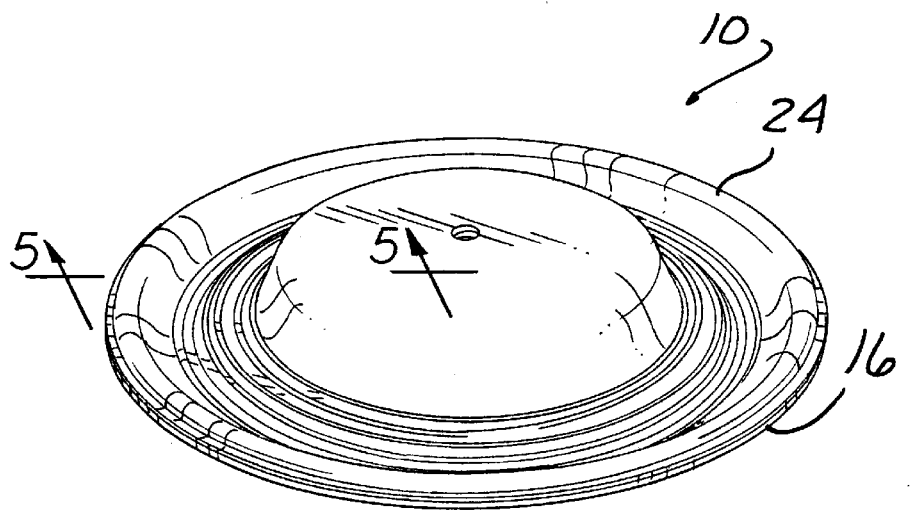
FIG. 4 is a perspective view of a composite layered product according to the present invention.
Figure 5:
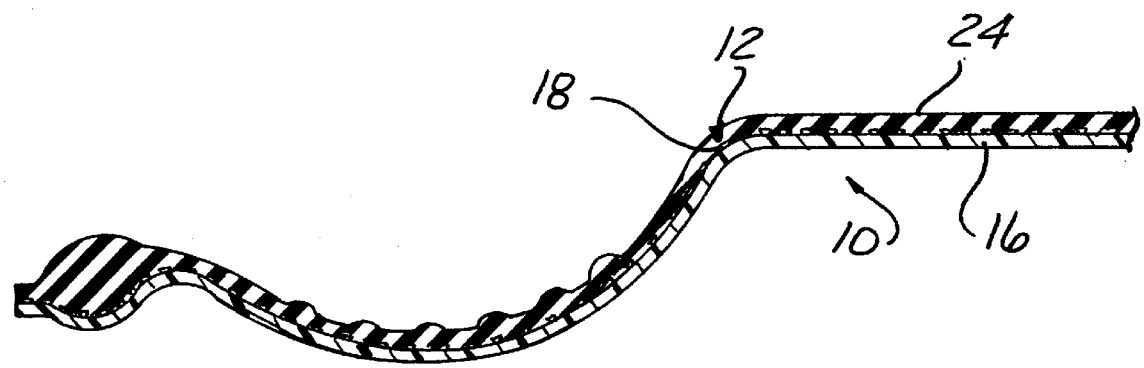
FIG. 5 is a cross sectional view of the composite layered product taken as shown in FIG. 4.

By way of example and not limitation, a virgin PTFE thermoplastic material sheet 16 can be inserted into a molding die, where a dissimilar material is introduced into the die under pressure. The plurality of protuberances 18 on the virgin PTFE plastic sheet 16 are deformed during the molding process, so that the at least one side wall 20 is deformed to trap a portion of the molded dissimilar material 24 between the protuberance 18 and the sheet 16, thereby mechanically locking the two materials along an interface disposed therebetween. The product formed can be used as a diaphragm in valve and/or pump applications, as a bearing pad, or in any other application where dissimilar materials present delamination problems. By way of example and not limitation, the dissimilar material molded with the virgin PTFE sheet 16 can be a natural or synthetic rubber suitable for use as a pump diaphragm as illustrated in FIGS. 4 and 5. Testing has shown that adhesively or chemically bonded pump diaphragms of virgin PTFE and rubber have an average service life of approximately eight hundred thousand (800,000) to one million (1,000,000) cycles. A pump diaphragm product manufactured according to the present invention with virgin PTFE mechanically interlocked to rubber, has successfully completed over four million five hundred thousand (4,500,000) cycles without failure. The method and product according to the present invention is capable of dramatically increasing service life of composite layered material products.

It is contemplated to be within the purview of the invention that in addition to rubber the following dissimilar materials can be used for molding with the planar sheet, where the dissimilar material is selected from the group consisting of natural rubbers; vulcanized rubbers, butadiene-styrene copolymers, chloroprene polymers; nitrile rubbers; butadiene-acrylonitrile copolymers; isobutylene copolymers; butyl rubbers, polysulfide rubbers; ethylene-propylene rubbers; polyurethane elastomers, silicone rubbers, fluorocarbon elastomers; polyester elastomers; chlorinated rubbers; rubber hydrochloride; cyclized rubbers; chlorosulphonated polyethylene; and mixtures thereof. Alternatively, it is contemplated to be within the purview of the invention that in addition to rubber, the following dissimilar materials can also be used for molding with the planar sheet 16, where the dissimilar material contains as a major constituent an elastomer material selected from the group consisting of natural rubbers; vulcanized rubbers; butadiene-styrene copolymers; chloroprene polymers; nitrile rubbers; butadiene-acrylonitrile copolymers; isobutylene copolymers; butyl rubbers; polysulfide rubbers, ethylene-propylene rubbers, polyurethane elastomers; silicone rubbers; fluorocarbon elastomers; polyester elastomers; chlorinated rubbers; rubber hydrochloride; cyclized rubbers; chlorosulphonated polyethylene; and mixtures thereof.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A part manufactured according to a process comprising the steps of molding a thermoplastic material into a generally planar sheet form having a textured surface on at least one side, the textured surface defined by a plurality of protuberances with at least one side wall extending outwardly from the sheet, the thermoplastic material molded with a predetermined pressure between a die and within a perforated insert, removing the molded thermoplastic material sheet and perforated insert from the die, and sintering the molded thermoplastic material sheet at a predetermined temperature for a predetermined period of time, the part comprising:

a thermoplastic material molded and sintered into a generally planar sheet form having a textured surface on at least one side, the textured surface defined by a plurality of protuberances with at least one side wall extending outwardly from the sheet; and a dissimilar material layer molded to the textured surface of the sheet and a mechanically locked interface between the dissimilar material layer and the sheet as a result of deformation of the protuberances during the molding process to define a composite layered product, the composite layered product defining a pump diaphragm with the thermoplastic material sheet capable of exposure to a corrosive fluid to be transported mechanically locked to the dissimilar material.

2. The part of claim 1 further comprising:

the protuberances increasing an effective surface area of the thermoplastic material sheet by at least 35% compared with a surface area of the sheet absent the protuberances.

3. The part of claim 1 further comprising:

the protuberances increasing an effective surface area of the thermoplastic material sheet by between 35% and 40%, inclusive compared with a surface area of the sheet absent the protuberances.

4. The part of claim 1 further comprising:

the at least one side wall extending outwardly in a direction generally perpendicular to the sheet.

5. The part of claim 1 further comprising:

the protuberances spaced from one another on the at least one side of the sheet.

6. The part of claim 1 further comprising:

the protuberances disposed in a geometric pattern.

7. The part of claim 1 wherein the thermoplastic material is selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultrahigh-molecular-weight polyethylene (UHMWPE), and mixtures thereof.

8. The part of claim 1 wherein the thermoplastic material contains as a major constituent a material selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultrahigh-molecular-weight polyethylene (UHMWPE), and mixtures thereof.

9. The part of claim 1 wherein the dissimilar material is selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof.

10. The part of claim 1 wherein the dissimilar material contains as a major constituent an elastomer material selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof.

11. The part of claim 1 further comprising:

the thermoplastic material sheet composed at least primarily of polytetrafluoroethylene (PTFE) and the dissimilar material composed at least primarily of rubber.

12. The part of claim 1 further comprising:

the plurality of protuberances distributed over the at least one surface of the sheet.

13. The part of claim 12 further comprising:

the plurality of protuberances evenly distributed over the at least one surface of the sheet.

14. The part of claim 12 further comprising:

the plurality of protuberances uniformly distributed over the at least one surface of the sheet.

15. The part of claim 1 further comprising:

the plurality of protuberances deformable under pressure so that at least one side wall of the protuberance moves into an angled orientation with respect to the at least one surface of the sheet to define a plurality of individual mechanical locking members along an interface between the sheet and the dissimilar material layer to be introduced during pressurized molding.

16. The part of claim 15 further comprising:

a portion of the dissimilar material layer being trapped between the angled side wall of each protuberance mechanically interlocking the sheet along the interface with the dissimilar material layer.

17. A part comprising:

a thermoplastic material molded and sintered into a generally planar sheet form having a textured surface on at least one side, the textured surface defined by a plurality of protuberances with at least one side wall extending outwardly from the sheet; and a dissimilar material layer molded to the textured surface of the sheet and a mechanically locked interface between the dissimilar material layer and the sheet as a result of deformation of the protuberances during the molding process to define a composite layered product, the composite layered product defining a pump diaphragm with the thermoplastic material sheet capable of exposure to a corrosive fluid to be transported mechanically locked to the dissimilar material.

18. The part of claim 17 further comprising:

the protuberances increasing an effective surface area of the thermoplastic material sheet by at least 35% compared with a surface area of the sheet absent the protuberances.

19. The part of claim 17 further comprising:

the protuberances increasing an effective surface area of the thermoplastic material sheet by between 35% and 40%, inclusive compared with a surface area of the sheet absent the protuberances.

20. The part of claim 17 further comprising:

the at least one side wall extending outwardly in a direction generally perpendicular to the sheet.

21. The part of claim 17 further comprising:

the protuberances spaced from one another on the at least one side of the sheet.

22. The part of claim 17 further comprising:

the protuberances disposed in a geometric pattern.

23. The part of claim 17 wherein the thermoplastic material is selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultrahigh-molecular-weight polyethylene (UHMWPE), and mixtures thereof.

24. The part of claim 17 wherein the thermoplastic material contains as a major constituent a material selected from the group consisting of fluoroplastic polymers, polytetrafluoroethylene (PTFE), fluorinated ethylene propylene (FEP) copolymers, perfluoroalkoxy (PFA) resins, polychlorotrifluoroethylene (PCTFE), ethylene-chlorotrifluoroethylene (ECTFE) copolymers, ethylene-tetrafluoroethylene (ETFE) copolymers, polyvinylidene fluoride (PVDF), polyvinyl fluoride (PVF), ultrahigh-molecular-weight polyethylene (UHMWPE), and mixtures thereof.

25. The part of claim 17 wherein the dissimilar material is selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof.

26. The part of claim 17 wherein the dissimilar material contains as a major constituent an elastomer material selected from the group consisting of natural rubbers, vulcanized rubbers, butadiene-styrene copolymers, chloroprene polymers, nitrile rubbers, butadiene-acrylonitrile copolymers, isobutylene copolymers, butyl rubbers, polysulfide rubbers, ethylene-propylene rubbers, polyurethane elastomers, silicone rubbers, fluorocarbon elastomers, polyester elastomers, chlorinated rubbers, rubber hydrochloride, cyclized rubbers, chlorosulphonated polyethylene, and mixtures thereof.

27. The part of claim 17 further comprising:

the thermoplastic material sheet composed at least primarily of polytetrafluoroethylene (PTFE) and the dissimilar material composed at least primarily of rubber.

28. The part of claim 17 further comprising:

the plurality of protuberances distributed over the at least one surface of the sheet.

29. The part of claim 28 further comprising:

the plurality of protuberances evenly distributed over the at least one surface of the sheet.

30. The part of claim 28 further comprising:

the plurality of protuberances uniformly distributed over the at least one surface of the sheet.

31. The part of claim 17 further comprising:

the plurality of protuberances deformable under pressure so that at least one side wall of the protuberance moves into an angled orientation with respect to the at least one surface of the sheet to define a plurality of individual mechanical locking members along an interface between the sheet and the dissimilar material layer to be introduced during pressurized molding.

32. The part of claim 31 further comprising:

a portion of the dissimilar material layer being trapped between the angled side wall of each protuberance mechanically interlocking the sheet along the interface with the dissimilar material layer.

* * * * *